Oct. 7, 1952  G. B. SAYRE  2,612,658
TRANSFER MOLDING PRESS
Filed May 14, 1947  2 SHEETS—SHEET 1

INVENTOR
GORDON B. SAYRE
BY
ATTORNEY

Oct. 7, 1952 G. B. SAYRE 2,612,658
TRANSFER MOLDING PRESS
Filed May 14, 1947 2 SHEETS—SHEET 2

INVENTOR
GORDON B. SAYRE
BY
*James and Franklin*
ATTORNEY

Patented Oct. 7, 1952

2,612,658

UNITED STATES PATENT OFFICE 2,612,658

TRANSFER MOLDING PRESS

Gordon B. Sayre, Boonton, N. J., assignor to Boonton Molding Company, Boonton, N. J., a corporation of New Jersey Application May 14, 1947, Serial No. 748,065

26 Claims. (Cl. 18—30)

This invention relates to molding presses, and more particularly to an inverted or upward-transfer molding press for molding thermosetting plastics.

The usual transfer molding press is arranged with the main or clamp cylinder at the bottom, and the transfer cylinder at the top. This introduces certain disadvantages, and a primary object of the present invention is to overcome those disadvantages and to generally improve transfer molding presses.

More specific objects of the invention are to devise a transfer molding press in which the molding material or pill may be dropped downwardly into a transfer pot which is open at the top whenever the mold is open; in which the transfer pot is at a comparatively low height convenient for the operator; in which the transfer pot is always closed at the bottom even with the mold open; in which the necessary length of stroke for the transfer plunger is minimized to that needed for the transfer operation alone; in which the operating time for each cycle is shortened; in which the transfer plunger may itself be used as an ejection or knock-out means or separating the residue or pot cull from the die; and in which the ejected product may be removed from the lower half of the die without a gravitational drop from the upper half to the lower half of the die, with consequent chance of breakage.

A still further object is to facilitate control of the numerous valves required, by the use of certain simplified and partly automatic valves.

To accomplish the foregoing general objects, and other more specific objects which will hereinafter appear, my invention resides in the transfer press elements and their relation one to the other, as are hereinafter more particularly described in the following specification. The specification is accompanied by drawings, in which.

Figure 1:
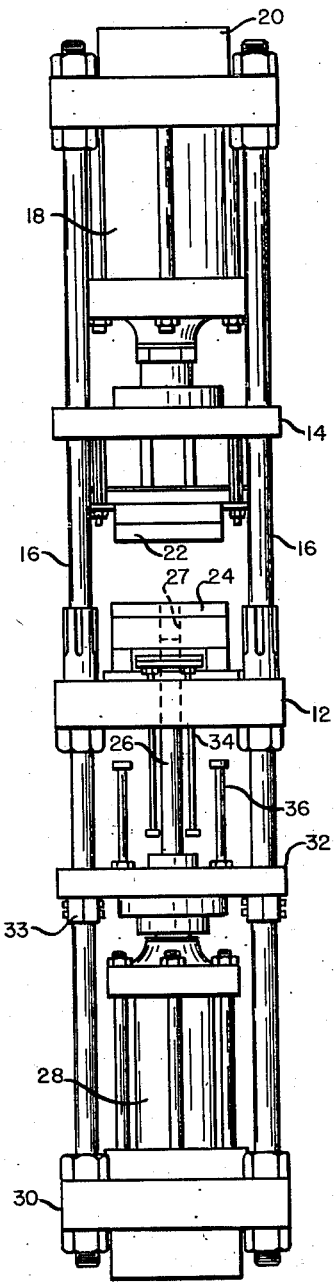
Fig. 1 is a front elevation of an inverted transfer molding press embodying features of the present invention.
Figure 2:
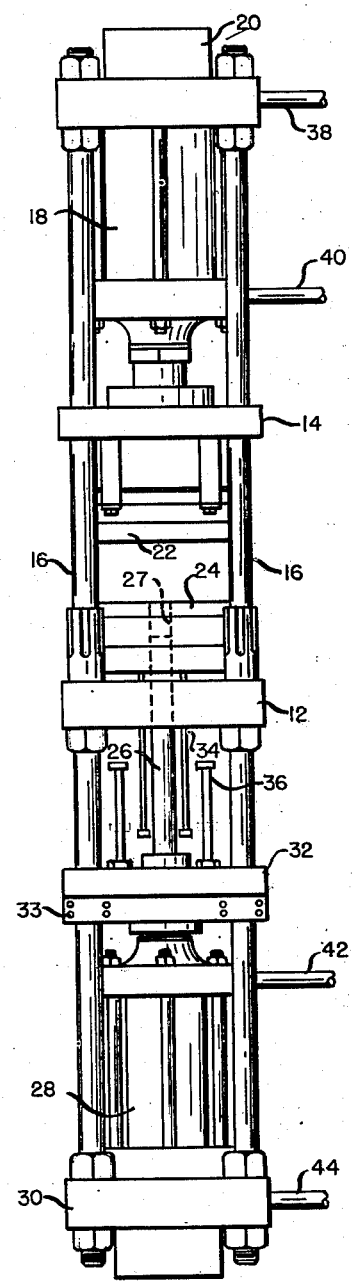
Fig. 2 is a side elevation of the same.

Referring to the drawings, and more particularly to Figs. 1 and 2, the inverted transfer molding press comprises a stationary head or platen 12, and a movable head 14 slidable on tie rods 16. The movable head 14 or platen is moved by means of a piston in a main or clamp cylinder 18, carried on a stationary head 20, secured to the upper ends of the tie rods 16. The upper half 22 of the die is mounted on the movable platen or head 14. The lower half 24 of the die is mounted on the stationary platen or head 12.

The transfer plunger 26 is located at the bottom, and is operated by a piston in a bottom transfer cylinder 28, the latter being carried by a statonary head 30 secured to the lower ends of the tie rods 16. A movable platen 32 may be provided between the cylinder 28 and the transfer plunger 26, the platen 32 being slidable on the tie rods 16, and acting as a cross-head or guide.

It will be seen that with this arrangement the transfer pot 27 is formed directly in the lower half 24 of the die, and that the transfer pot is open and accessible whenever the mold is open. It will also be seen that the transfer pot is at all times closed at the bottom by the transfer plunger 26. To load the mold it is merely necessary to drop the molding material, preferably in pill form, in the transfer pot 27. As soon as the upper half 22 of the mold has been moved downwardly against the lower half 24, the transfer plunger 26 may be raised, thereby compressing the material upwardly and extruding it outwardly into the appropriate mold cavities. The plunger stroke need be no greater than is needed for this transfer purpose. There is no need to delay transfer after closing the mold to afford time to load the mold.

The last part of the upward movement of the platen 32 may be used for ejection purposes. At such time the platen bears against push studs 34, which in turn move an ejector plate in the ejector die 24. The ejector plate has the usual ejector pins. The transfer plunger 26 itself acts as an ejection means for the pot cull or residue. The upward stroke is limited by adjustable stops 36, which in the present case are shown mounted on platen 32, and are intended to bear against the lower side of the stationary head 12. Downward movement of platen 32 may be limited by stops 33.

The clamp cylinder 18 and the transfer cylinder 28 must be double-acting, and therefore pipe connections are shown leading to both the upper and lower ends of the cylinders. In Fig. 2 there are pipe connections 38 and 40 leading to the upper and lower ends respectively of the clamp cylinder 18. There are pipes 42 and 44 leading to the upper and lower ends respectively of the transfer cylinder 28.

Figure 3:
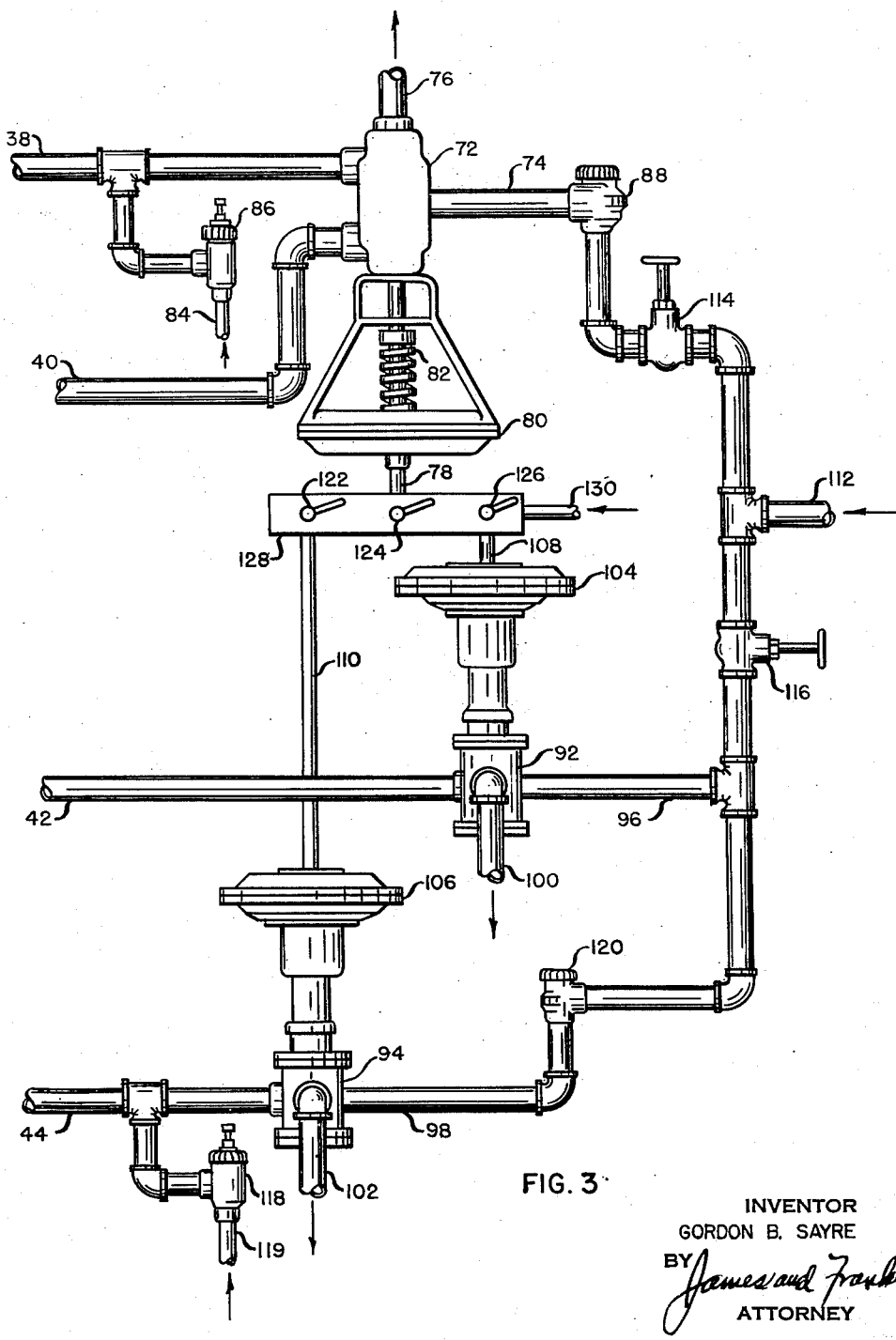
Fig. 3 is a schematic diagram of one preferred valve arrangement which may be used with the present invention.

The valve arrangement for the press is schematically illustrated in Fig. 3 of the drawing, referring to which it will be seen that the pipes 38 and 40 leading to the clamp cylinder of the press are connected to a four-way hydraulic valve 72. A suitable fluid under pressure, usually water, is supplied through a pipe 74. There is also a waste pipe 76. The four-way valve is actuated by compressed air supplied through an air pipe 78, and operating on a diaphragm located at 80. The return movement is by means of a compression spring 82.

For economy in the use of high pressure water, the main movement of the clamp piston is preferably produced by relatively low pressure water supplied through pipe 74, the available pressure being a matter of say 700 pounds per square inch (although an even lower pressure is adequate to move the mold). During the molding operation, the mold is preferably kept closed under a high pressure of the order of say 2800 pounds per square inch. High pressure water is supplied through a pipe 84, and a so-called "automatic high" valve 86, and thence to pipe 38. During closing of the mold, the back pressure on the automatic high valve may a matter of only 150 pounds per square inch, and the valve remains closed. When the mold closes, the back pressure on the automatic high valve 86 builds up to say 700 pounds per square inch, whereupon the valve opens, admitting high pressure water to the clamp cylinder. Loss of this high pressure water into the low pressure line 74 is prevented by a suitable check valve 88.

It will be observed that the high pressure line is connected to pipe 38 leading to the upper end of the clamp cylinder, but not to the pipe 40 leading to the lower end of the clamp cylinder. The reason is that the low pressure water is adequate to raise or open the mold, and there is no need to supply high pressure water for this purpose. However, if that were desired it would be necessary merely to make a connection through an automatic high valve to pipe 40, similar to that shown here to pipe 38.

The desired control of the transfer cylinder through pipes 42 and 44 is somewhat more involved, and it is preferable not to employ a single four-way valve such as the valve 72. The reason for this is that the four-way valve would provide for only two conditions, the transfer plunger tending to move either upward all the way to its top limit, or downward all the way to its bottom limit. Now the transfer plunger preferably should not be moved downward before the molded piece is removed, for the resulting suction between the upper end of the plunger and the lower end of the pot cull will tend to draw the cull downwardly with the plunger, breaking it away from the gate and the molded pieces. If, on the other hand, pressure is maintained on the transfer plunger as the mold is opened, the plunger will press upwardly and hold the pot cull against the upper half of the mold. There would be a tendency to break the pot cull from the gate, or in the alternative, to prematurely eject the gate from the lower mold or ejector die. It will not do to simply mechanically limit the amount of additional upward movement of the plunger to a very small amount, on the one hand, for that would not be adequate for a relatively deep molded piece, and on the other hand the provision of a large permitted movement would require a still greater movement of the cover die, which would be wasteful of time and hydraulic power. Moreover, with the piece first ejected from the lower die, it will tend to adhere to the upper die. The upper die might be made the ejector die, but that is itself a disadvantage.

Instead, in accordance with the present invention, the transfer plunger is preferably kept stationary while the mold is opened, and the transfer plunger is thereafter moved upwardly as a part of the ejection operation. To accomplish this the pipes 42 and 44 leading to the ends of the transfer cylinder are each provided with individual three-way valves 92 and 94 respectively. These have connections 96 and 98 for pressure water, and waste connections 100 and 102. The valves are preferably air-operated valves, having diaphragms at 104 and 106, with air pipes 108 and 110. The low pressure water is supplied at 112. The manually operable valves 114 and 116 inserted between the supply pipe 112 and the valves for the two cylinders, are normally open.

If it be desired to use high pressure water for the transfer operation, it is merely necessary to use an automatic high valve 118, connected to the lower pipe 44 of the transfer cylinder, and a suitable check valve 120 to prevent backing of the high pressure water into the low pressure line. The pipe 119 is connected to the high pressure source.

The transfer cylinder may be operated without using high pressure water, in which case the automatic high valve 118 may be omitted. In such case, the transfer cylinder will approach the clamp cylinder in dimension. For example, in some presses I have employed a clamp cylinder which is 9½ inches in diameter, and a transfer cylinder which is 8 inches in diameter, in which case it is adequate to use low pressure water for the transfer cylinder.

However, I believe it is preferable to employ a small transfer cylinder, say, four inches in diameter, and to use high pressure water. The reason for this is that only say one-fourth as much low pressure water is needed for each stroke of the transfer plunger. Of course, it is then necessary to employ some high pressure water, but the amount of this used is so small that an over-all economy is effected.

The valves referred to in the above description are made by and may be purchased from Seely Instrument Company, Inc. of Niagara Falls, New York, and Sinclair Collins Company of Akron, Ohio, and others.

The supply of air is controlled by air valves indicated schematically at 122, 124, and 126. These are shown combined in a valve block 128, supplied with compressed air at 130. Each valve is a three-way air valve, it being understood that there is an outlet to waste or open air, so that each of the pipes 78, 108, and 110 may be connected to either the compressed air supply 130, or to the open air.

The operation is next described, assuming that the press is in open or repose condition; that it has already been warmed up; and that a pill has been placed in the transfer pot. Valve 124 is operated to cause descent of the moving head of the press, thus clamping the mold closed. The further application of high pressure water as soon as the mold is closed is taken care of by the automatic high valve 86, as previously described.

When the mold is closed the valve 122 is operated to raise the transfer plunger. The further application of high pressure water when the transfer plunger has been raised (if high pressure water is being used) is taken care of by the automatic high valve 118, as previously described. The operator observes a clock or other suitable means to measure the curing time. The press remains in closed condition until the desired curing time has run out. Then the valve 122 is moved so as to release the pressure in the lower end of the transfer cylinder. This insures that the transfer plunger will remain stationary. At the same time the valve 124 is operated to open the mold. As soon as the mold has opened a short distance, and while it continues its opening movement, the valve 122 is moved to further raise the transfer plunger. This last part of the movement of the transfer plunger ejects the pot cull from the transfer pot, and at the same time raises the ejector pins in the lower or ejector half of the mold, so that the molded pieces and gates are all raised simultaneously with the pot cull.

The molded pieces and pot cull are removed manually, and the valves 122 and 126 are operated to lower the transfer plunger, following which a new pill is loaded into the transfer pot. Thereupon the entire operation is repeated.

The foregoing completes a normal cycle as follows. The mold is closed; material is transferred from the pot into the mold; the material is cured for a desired time; the mold is then partially opened; the molded piece is ejected; the mold is fully opened; the mold is emptied; the transfer plunger is restored to lowermost position; and the mold is loaded.

In setting up a new mold in the press, it is desirable to be able to manually control the press to produce small increments of movement. In Fig. 3 the valve 114 may be nearly closed, in order to greatly restrict the speed at which the clamp cylinder operates. This speed control may be used even when molding, but is particularly valuable when setting up a new mold, for by keeping one hand on valve 114 it may be intermittently closed and cracked open, to move the upper mold downwardly increment by increment; and by leaving the valve 114 closed the mold will be held in whatever position it was in when the valve was closed. This is so even if the valve 124 is left in mold-closing position; for with the valve 114 closed there is no supply of pressure water to move the mold. By cracking the valve 114 intermittently after moving the valve 124 to mold-closing position, the upper half of the mold may be moved incrementally in closing direction, and similarly, by cracking the valve 114 intermittently while keeping the valve 124 in mold-opening direction, the upper half of the mold may be moved incrementally in opening direction.

In somewhat similar fashion the valve 116 may be used to control the operation of the transfer cylinder and plunger. The speed at which the transfer plunger moves may be controlled by manual adjustment of the valve 116. This may be done even for normal molding. The valve 116 may be intermittently closed and cracked open for precise control of the transfer plunger when setting up a new mold installation. By intermittently cracking the valve 116 while keeping the valves 122 and 126 in appropriate position, the plunger will be incrementally moved downward, and by intermittently cracking the valve 116 while keeping the valves 122 and 126 in opposite position, the plunger will be incrementally moved upward.

It is believed that the construction and operation of my improved transfer molding press, as well as the advantages thereof, will be apparent from the foregoing detailed description. The inverted press is of advantage, because the molding material may be loaded downwardly into a transfer pot at convenient height. The pot is open at the top and is always closed at the bottom, even with the mold open. The pot may be loaded while the mold is open. Transfer can begin as soon as the mold is closed. The stroke needed for the transfer plunger is small, compared to that needed when the plunger and loading station are above the mold. Any flash formed around the plunger tends to drop gravitationally in a downward direction away from the mold, instead of tending to fall into the mold, with the consequent danger of spoiling the molded piece. With the present arrangement there is no danger of suction by the plunger on the cull pulling the cull away from the molded piece.

It is a simple matter to keep the press closed in order to heat the same. The parts of the press may be controlled manually, and in small increments, to take care of setting up a new mold in the press.

It will be apparent that while I have shown and described the improved press of my invention in a preferred form, changes may be made in the structure and valves shown, without departing from the spirit of the invention, as sought to be defined in the following claims.

I claim:

1. A press for the transfer molding of thermosetting plastics in a die having ejector means, said press comprising fixedly related superposed clamp and transfer cylinders, the clamp cylinder being located at the top of the press for vertically moving a platen adapted to carry a cover die, stationary means to fixedly hold the ejector portion of the die, the transfer cylinder being located at the bottom of the press for moving a transfer plunger upwardly into the fixed ejector portion of the die, and means also moved by the transfer cylinder and plunger to operate the ejector means of the die, whereby said die may be closed, the molding material transfer molded, and the molded piece ejected, while using only two cylinders.

2. A press and die for the transfer molding of thermosetting plastics, said die having a cover portion on top, an ejector portion on bottom, a transfer chamber through the ejector portion, and ejector mechanism beneath the ejector portion around the transfer chamber, said press comprising coaxially arranged oppositely pointed clamp and transfer cylinders, the center line of said press being disposed vertically, the clamp cylinder being located at the top of the press for moving a platen carrying the cover die, stationary means to fixedly hold the ejector portion of the die, the transfer cylinder being located at the bottom of the press for moving a transfer plunger upwardly into the fixed ejector portion of the die, and means also moved by the transfer cylinder and plunger to operate the ejector means of the die, whereby said die may be closed, the molding material transfer molded, and the molded piece ejected, while using only two cylinders.

3. A press for the transfer-molding of thermosetting plastics in a die having ejector means, said press comprising a downwardly directed clamp cylinder at the top of the press, an upwardly directed transfer cylinder at the bottom of the press, tie rods between said cylinders, a movable platen beneath the clamp cylinder for carrying a cover die, said platen being slidable on said tie rods and moved by the piston of said clamp cylinder, a stationary platen above the transfer cylinder for carrying an ejector die, said stationary platen being fixedly mounted on said tie rods beneath said movable platen, an upwardly pointed transfer plunger moved by said transfer cylinder, and means also moved by the transfer cylinder and plunger to operate the ejector means of the die, whereby said die may be closed, the molding material transfer molded, and the moled piece ejected, while using only two cylinders.

4. A press and die for the transfer molding of thermosetting plastics, said die having a cover portion on top, an ejector portion on bottom, a transfer chamber through the ejector portion, and ejector mechanism beneath the ejector portion around the transfer chamber, said press comprising stationary top and bottom heads connected and spaced apart by tie rods, a downwardly directed clamp cylinder mounted beneath the stationary head at the top of the press, a movable platen slidable on said tie rods and moved by the piston of said clamp cylinder, said platen carrying said cover die, a stationary platen fixedly mounted on said tie rods beneath said movable platen and carrying the ejector die, an upwardly directed transfer cylinder mounted above said stationary head at the bottom of the press and beneath the stationary platen, an upwardly pointed transfer plunger moved by the piston of said transfer cylinder, and means also moved by the transfer cylinder and plunger to operate the ejector means of the die, whereby said die may be closed, the molding material transfer molded, and the molded piece ejected, while using only two cylinders.

5. A press for the transfer molding of thermosetting plastics in a die having ejector means, said press comprising stationary top and bottom heads connected and spaced apart by four vertical tie rods, a downwardly directed clamp cylinder of relatively large diameter mounted beneath stationary head at the top of the press, a movable platen slidable on said tie rods and moved by the piston of said clamp cylinder, a stationary platen mounted on said tie rods beneath said movable platen, an upwardly directed transfer cylinder having a diameter smaller than the diameter of the clamp cylinder and mounted above said stationary head at the bottom of the press and beneath the stationary platen, an upwardly pointed transfer plunger moved by the piston of said transfer cylinder, and means also moved by the transfer cylinder and plunger to operate the ejector means of the die, whereby said die may be closed, the molding material transfer molded, and the molded piece ejected, while using only two cylinders.

6. A press for transfer-molding thermosetting plastics, said press comprising a downwardly directed clamp cylinder at the top of the press, an upwardly directed transfer cylinder at the bottom of the press, tie rods between said cylinders, a movable platen slidable on said tie rods and moved by the piston of said clamp cylinder, a stationary platen mounted on said tie rods beneath said movable platen, an upwardly pointed transfer plunger moved upwardly through said stationary platen by said transfer cylinder, and ejector plate push rods passing downwardly through the stationary platen, said rods having a lost motion connection to the plunger and being arranged to be moved upwardly by the plunger during the last part of its upward movement.

7. A transfer press as defined in claim 3, in which a cross-head is provided at the lower end of the transfer plunger and above the transfer cylinder to act as the means to operate the ejector means, and in which stops are provided between the stationary platen and the cross-head to limit the upward movement of the transfer plunger.

8. A transfer press as defined in claim 3, in which a cover die is mounted on the movable platen, an ejector die is mounted on the stationary platen, a cross-head is provided at the lower end of the transfer plunger and above the transfer cylinder to act as the means to operate the ejector means, and in which push rods depend from the ejector die through the stationary platen to a point suitable for operation by the cross-head.

9. A transfer press as defined in claim 3, in which a cover die is mounted on the movable platen, an ejector die is mounted on the stationary platen, a cross-head is provided at the lower end of the transfer plunger and above the transfer cylinder to act as the means to operate the ejector means, and in which push rods depend from the ejector die through the stationary platen to a point suitable for operation by the cross-head, and in which stops are provided between the stationary platen and the cross-head to limit the upward movement of the transfer plunger.

10. A transfer press as defined in claim 5, in which a cover die is mounted on the movable platen, an ejector die is mounted on the stationary platen, a cross-head is provided at the lower end of the transfer plunger and above the transfer cylinder to act as the means to operate the ejector means, and in which push rods depend from the ejector die through the stationary platen to a point suitable for operation by the cross-head.

11. A transfer molding press as defined in claim 1, in which the clamp cylinder is controlled by an air-actuated four-way hydraulic valve, and in which each end of the transfer cylinder is controlled by an air-actuated three-way hydraulic valve.

12. A transfer press as defined in claim 11, in which the connection between a pressure source and the four-way hydraulic valve controlling the clamp cylinder includes a manually operable valve.

13. A transfer press as defined in claim 11, in which the connection between said pressure source and the two three-way hydraulic valves for the transfer cylinder includes a manually operable valve.

14. A transfer press as defined in claim 11, in which the connection between a pressure source and the four-way hydraulic valve controlling the clamp cylinder includes a manually operable valve, and in which the connection between said pressure source and the two three-way hydraulic valves for the transfer cylinder includes a manually operable valve.

15. A transfer molding press as defined in claim 1, in which the clamp cylinder is controlled by a hydraulic valve, and in which each end of the transfer cylinder is controlled by a hydraulic valve, said hydraulic valves being connected to a low pressure source, the upper end of the clamp cylinder being additionally provided with an automatic high valve connected to a high pressure source.

16. A transfer molding press as defined in claim 1, in which the clamp cylinder is controlled by a hydraulic valve, and in which each end of the transfer cylinder is controlled by a hydraulic valve, said hydraulic valves being connected to a low pressure source, the upper end of the clamp cylinder being additionally provided with an automatic high valve connected to a high pressure source, and the lower end of the transfer cylinder being additionally provided with an automatic high valve connected to a high pressure source.

17. A transfer molding press as defined in claim 1, in which the clamp cylinder is controlled by an air-actuated four-way hydraulic valve, and in which each end of the transfer cylinder is controlled by an air-actuated three-way hydraulic valve, said hydraulic valves being connected to a low pressure source, the upper end of the clamp cylinder being additionally provided with an automatic high valve connected to a high pressure source.

18. A transfer press as defined in claim 17, in which the connection between the low pressure source and the valve controlling the clamp cylinder includes a manually operable valve, and in which the connection between the low pressure source and the valves for the transfer cylinder includes a manually operable valve.

19. A transfer molding press as defined in claim 1, in which the clamp cylinder is controlled by an air-actuated four-way hydraulic valve, and in which each end of the transfer cylinder is controlled by an air-actuated three-way hydraulic valve, said hydraulic valves being connected to a low pressure source, the upper end of the clamp cylinder being additionally provided with an automatic high valve connected to a high pressure source, and the lower end of the transfer cylinder being additionally provided with an automatic high valve connected to a high pressure source.

20. A press comprising vertical, oppositely pointed clamp and transfer cylinders, the clamp cylinder being located at the top of the press, and the transfer cylinder being located at the bottom of the press, a horizontal stationary platen between said cylinders for fixedly carrying an upwardly facing stationary ejector die having an ejector plate and a transfer pot, a movable platen above said stationary platen for carrying a downwardly facing cover die, said movable platen being moved by said clamp cylinder, upwardly pointed pushrods for actuating the ejector plate of the ejector die, and means for operatively connecting said pushrods with the piston of the transfer cylinder, said means including a lost motion connection such that the pushrods are actuated by the transfer cylinder during only the last part of the upward movement of the transfer plunger.

21. A press for the transfer molding of thermosetting plastics, said press comprising coaxially arranged, oppositely pointed clamp and transfer cylinders, the center line of said press being disposed vertically, the clamp cylinder being located at the top of the press, and the transfer cylinder being located at the bottom of the press, a horizontal stationary platen between said cylinders for fixedly carrying an upwardly facing stationary ejector die having an ejector plate and a transfer pot, a movable platen above said stationary platen for carrying a downwardly facing cover die, said movable platen being moved by said clamp cylinder, upwardly pointed pushrods for actuating the ejector plate of the ejector die, and means for operatively connecting said pushrods with the piston of the transfer cylinder, said means including a lost motion connection such that the pushrods are actuated by the transfer cylinder during only the last part of the upward movement of the transfer plunger.

22. A press comprising vertical, oppositely pointed clamp and transfer cylinders, the clamp cylinder being located at the top of the press, and the transfer cylinder being located at the bottom of the press, a horizontal stationary platen between said cylinders for fixedly carrying an upwardly facing stationary ejector die having an ejector plate and a transfer pot, a movable platen above said stationary platen for carrying a downwardly facing cover die, said movable platen being moved by said clamp cylinder, a crosshead between the transfer cylinder and the stationary platen, said crosshead being secured to the transfer plunger for movement therewith, ejector plate pushrods depending from the ejector die through the stationary platen, the arrangement being such that there is lost motion during upward movement of the transfer plunger, but said pushrods may be moved upwardly by the transfer cylinder during the last part of continued upward movement of the transfer plunger.

23. A press for the transfer molding of thermosetting plastics, said press comprising coaxially arranged, oppositely pointed clamp and transfer cylinders, the center line of said press being disposed vertically, the clamp cylinder being located at the top of the press, and the transfer cylinder being located at the bottom of the press, a horizontal stationary platen between said cylinders for fixedly carrying an upwardly facing stationary ejector die having an ejector plate and a transfer pot, a movable platen above said stationary platen for carrying a downwardly facing cover die, said movable platen being moved by said clamp cylinder, a crosshead between the transfer cylinder and the stationary platen, said crosshead being secured to the transfer plunger for movement therewith, ejector plate pushrods depending from the ejector die through the stationary platen to a point above the crosshead, the arrangement being such that there is lost motion during upward movement of the transfer plunger, but said pushrods may be moved upwardly by the transfer cylinder during the last part of continued upward movement of the transfer plunger.

24. A press for transfer-molding thermosetting plastics, said press comprising a downwardly directed clamp cylinder at the top of the press, an upwardly directed transfer cylinder at the bottom of the press, tie rods between said cylinders, a movable platen slidable on said tie rods and moved by the piston of said clamp cylinder, a stationary platen mounted on said tie rods beneath said movable platen, an upwardly pointed transfer plunger moved by said transfer cylinder, a cover die mounted on the movable platen, an ejector die mounted on the stationary platen, a crosshead between the transfer plunger and the transfer cylinder, and push rods depending from the ejector die through the stationary platen to a point suitable for operation by the crosshead.

25. A press for transfer-molding thermosetting plastics, said press comprising a downwardly directed clamp cylinder at the top of the press, an upwardly directed transfer cylinder at the bottom of the press, tie rods between said cylinders, a movable platen slidable on said tie rods and moved by the piston of said clamp cylinder, a stationary platen mounted on said tie rods beneath said movable platen, an upwardly pointed transfer plunger moved by said transfer cylinder, a cover die mounted on the movable platen, an ejector die mounted on the stationary platen, a crosshead between the transfer plunger and the transfer cylinder, push rods depending from the ejector die through the stationary platen to a point suitable for operation by the crosshead, and stops between the stationary platen and the crosshead to limit the upward movement of the transfer plunger.

26. A press for transfer-molding thermosetting plastics, said press comprising stationary top and bottom heads connected and spaced apart by four vertical tie rods, a downwardly directed clamp cylinder of relatively large diameter mounted on the stationary head at the top of the press, a movable platen slidable on said tie rods and moved by the piston of said clamp cylinder, a stationary platen mounted on said tie rods beneath said movable platen, an upwardly directed transfer cylinder having a diameter smaller than the diameter of the clamp cylinder and mounted on said stationary head at the bottom of the press, an upwardly pointed transfer plunger moved by the piston of said transfer cylinder, a cover die mounted on the movable platen, an ejector die mounted on the stationary platen, a crosshead between the transfer plunger and the transfer cylinder, and push rods depending from the ejector die through the stationary platen to a point suitable for operation by the crosshead.

GORDON B. SAYRE.

REFERENCES CITED

The following references are of record in the file of this patent:

UNITED STATES PATENTS

| Number | Name | Date |
|---|---|---|
| 1,961,941 | Pack | June 5, 1934 |
| 2,182,059 | Schwartz | Dec. 5, 1939 |
| 2,365,282 | Lester et al. | Dec. 19, 1944 |
| 2,367,242 | Stacy | Jan. 16, 1945 |
| 2,523,137 | Nichols et al. | Sept. 19, 1950 |

FOREIGN PATENTS

| Number | Country | Date |
|---|---|---|
| 336,129 | Great Britain | Oct. 9, 1930 |
| 417,968 | Great Britain | Oct. 16, 1934 |